United States Patent
Mahoney et al.

(10) Patent No.: US 8,824,594 B2
(45) Date of Patent: Sep. 2, 2014

(54) DIGITAL FREQUENCY MODULATION AIDED AMPM PREDISTORTION DIGITAL TRANSMITTER

(71) Applicant: MStar Semiconductor, Inc., Hsinchu Hsien (TW)

(72) Inventors: Dennis Mahoney, Greensboro, NC (US); Chih-Ming Hung, Mckinney, TX (US)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/668,470

(22) Filed: Nov. 5, 2012

(65) Prior Publication Data

US 2014/0126669 A1 May 8, 2014

(51) Int. Cl.
*H04K 1/02* (2006.01)
(52) U.S. Cl.
USPC .......................... 375/297; 375/296
(58) Field of Classification Search
CPC ............. H03F 1/3247; H04L 27/368
See application file for complete search history.

(56) References Cited

U.S. PATENT DOCUMENTS

| | | | |
|---|---|---|---|
| 7,215,716 B1 * | 5/2007 | Smith | 375/296 |
| 8,009,762 B1 | 8/2011 | Al-Qaq et al. | |
| 8,054,912 B2 | 11/2011 | Ba et al. | |
| 2006/0291589 A1 | 12/2006 | Eliezer et al. | |
| 2009/0290631 A1 * | 11/2009 | Lee et al. | 375/240 |
| 2012/0002752 A1 * | 1/2012 | Coan et al. | 375/297 |

* cited by examiner

*Primary Examiner* — Leon-Viet Nguyen
(74) *Attorney, Agent, or Firm* — Edell, Shapiro & Finnan, LLC (57) ABSTRACT

Amplitude-modulation (AM) to AM (AMAM) predistortion data is obtained from an AMAM predistorter. When applied to a digital quadrature signal, the AMAM predistortion data predistorts in-phase (I) and quadrature (Q) data words in a digital quadrature modulator. AM to phase-modulation (AMPM) predistortion data is obtained that is associated with the AMAM predistortion data and a frequency change or a phase shift in a local oscillator (LO) signal is compelled in accordance with the AMPM predistortion data. The frequency-changed or phase-shifted LO signal is provided to a digital upconverter such that an output signal of the digital upconverter is linearized with respect to at least phase distortion in the digital upconverter.

17 Claims, 9 Drawing Sheets

DIGITAL FREQUENCY MODULATION AIDED AMPM PREDISTORTION DIGITAL TRANSMITTER

TECHNICAL FIELD

The present disclosure relates to predistortion in digital modulators.

BACKGROUND

Wireless communication technology has advanced to its present state of the art in part due to digital quadrature modulation (DQM, the acronym also referring also to digital quadrature modulators) and direct digital modulation techniques. Such systems may employ radio-frequency digital-to-analog converters (RFDAC) or digital power amplifiers (DPA) that generate an output voltage or current in accordance a number of current cells that are active therein. Current cell mismatch and intermodulation distortion (IMD) can impact both amplitude and phase at the output of a DPA.

Figure 1A:
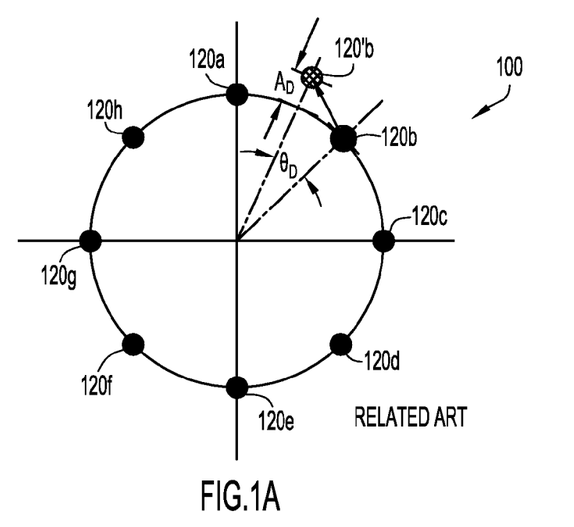
FIG. 1A is a diagram of an eight (8) symbol phase-shift keying (8-PSK) constellation illustrating the effects thereon from AMAM and AMPM distortion.

FIG. 1A is an illustration of an exemplary modulation constellation 100, which, merely for purposes of explanation, is an 8-symbol phase-shift keying (PSK) modulator constellation. Constellation 100 includes 8 modulation symbols 120a-120h, representatively referred to herein as symbol(s) 120. Distortion in a DPA can cause a symbol 120b' to be generated that is removed from its specified symbol state, i.e., at symbol 120b, by an amplitude error $A_D$ and a phase error $\phi_D$. Errors $A_D$ and $\phi_D$ can manifest themselves in erroneous decisions at a receiver to which symbols 120 are transmitted by the DPA.

Figure 1B:
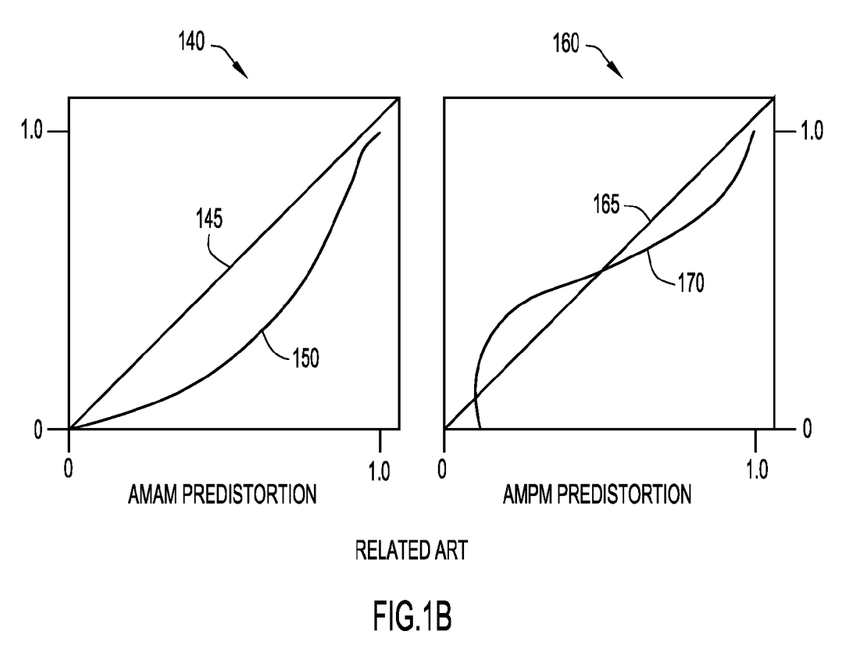
FIG. 1B is a pair of graphs illustrating AMAM and AMPM predistortion curves.

The values of $A_D$ and $\phi_D$ can be determined from, for example, a modulation error vector 130 measurement by suitable test equipment. By making a suitable number of such measurements, an amplitude modulation (AM) to AM (AMAM) distortion profile and an AM to phase modulation (AMPM) distortion profile can be obtained. From such AMAM and AMPM distortion profiles, corresponding AMAM and AMPM predistortion profiles can be determined, such as by a suitable functional inversion of the AMAM and AMPM distortion profiles. An example of an AMAM predistortion profile is illustrated in FIG. 1B by AMAM predistortion curve 150 in graph 140 and an example of an AMPM predistortion profile is illustrated in FIG. 1B by AMPM predistortion curve 170 in graph 160. Line 145 in graph 140 illustrates a target amplitude linearization in the DPA to be achieved by applying AMAM predistortion according to AMAM predistortion curve 150 and line 165 in graph 160 illustrates a target phase linearization to be achieved by applying AMPM predistortion according to AMPM predistortion curve 170. Applying AMAM predistortion to data provided to a DPA can reduce or even eliminate the amplitude error $A_D$ and, likewise applying AMPM predistortion to the DPA can reduce or eliminate phase error $\phi_D$.

In DQM transmitters, separate in-phase (I) and quadrature (Q) data channels may be constructed and parallel processing may be performed in the I and Q data channels from the modulator at which they are generated to the DPA circuit that upconverts I and Q data into an output signal. One technique for applying both AMAM and AMPM predistortion is by converting Cartesian I and Q data into a polar representation thereof, i.e., $$A = \sqrt{i^2 + q^2}, \text{ for } I = i \text{ and } Q = q, \text{ and}$$

$$\phi = \arg(i, q) = \begin{cases} \arctan(q/i), & i > 0 \\ \pi/2 - \arctan(i/q), & q > 0 \\ -\pi/2 - \arctan(i/q), & q < 0 \\ \pi + \arctan(q/i), & i < 0, q \geq 0 \\ -\pi + \arctan(q/i), & i < 0, q < 0 \\ \text{Undefined}, & i = 0, q = 0 \end{cases}$$

Subsequent to such conversion, the predistortion can be achieved by applying amplitude A and phase $\phi$ corrections, e.g., $A_{PD}=A+A_{AMAM}$ and $\phi_{PD}=\phi+\phi_{AMPM}$, where $A_{PD}$ and $\phi_{PD}$ are the predistorted amplitude and phase, respectively, of the data to be provided to the DPA, $A_{AMAM}$ is the AMAM predistortion value, which can be positive or negative, and $\phi_{AMPM}$ is the AMPM predistortion value, which also may be positive or negative. However, in DQM systems, the $A_{PD}$ and $\phi_{PD}$ values must be converted back into Cartesian representations I and Q, requiring additional hardware and a longer critical path. Applying both AMAM and AMPM directly to Cartesian I and Q data is challenging in that changing the I and Q values separately to effect AMAM predistortion can cause an additional phase rotation that must be compensated for in AMPM predistortion or by a suitable phase rotation technique. Likewise, applying AMPM on separate I and Q values produces additional compansion, i.e., compression or expansion in amplitude, which must be compensated for by AMAM predistortion.

Given the state of the current art, the need is apparent for a technique by which Cartesian AMAM and AMPM predistortion can be applied to linearize a DPA.

SUMMARY

Amplitude-modulation (AM) to AM (AMAM) predistortion data is obtained from an AMAM predistorter. When applied to a digital quadrature signal, the AMAM predistortion data predistorts in-phase (I) and quadrature (Q) data words in a digital quadrature modulator. AM to phase-modulation (AMPM) predistortion data is obtained that is associated with the AMAM predistortion data and a frequency change or a phase shift in a local oscillator (LO) signal is compelled in accordance with the AMPM predistortion data. The frequency-changed or phase-shifted LO signal is provided to a digital upconverter such that an output signal of the digital upconverter is linearized with respect to at least phase distortion in the digital upconverter.

DESCRIPTION OF EXAMPLE EMBODIMENTS

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, mathematical expressions are contained herein and those principles conveyed thereby are to be taken as being thoroughly described thereby. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

Figure 2:
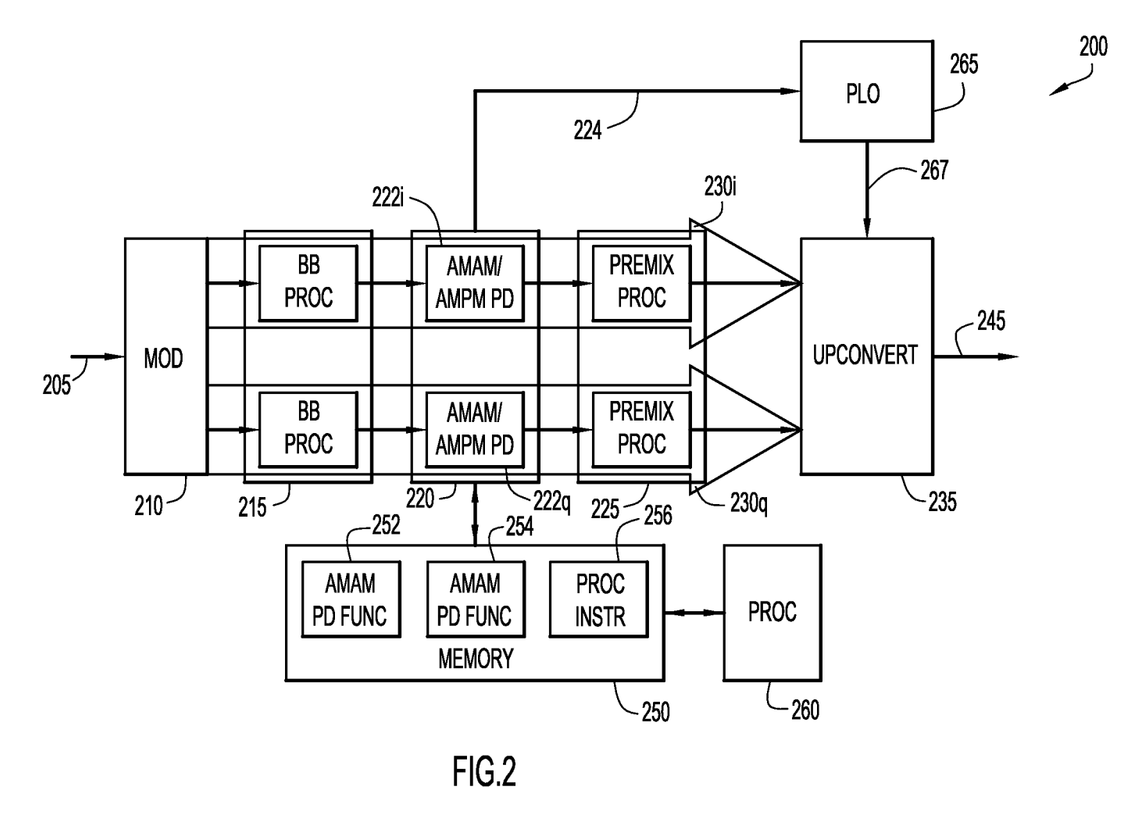
FIG. 2 is a schematic block diagram of a digital quadrature transmitter by which the present general inventive concept can be embodied.

FIG. 2 is a schematic block diagram of a digital transmitter 200 by which an information-bearing digital signal 205 may be modulated onto a carrier signal having a frequency $F_C$, referred to herein as an output signal 245. It is to be understood that digital transmitter 200 is a generalized configuration that encompasses a variety of transmitter implementations. That is, while narrower implementation details are not described with reference to FIG. 2, the depiction and description of digital transmitter 200 is complete for purposes of explaining broad mechanisms that can be embodied in conjunction with the present invention. An example embodiment revealing more implementation details is discussed below with reference to FIG. 4.

As illustrated in FIG. 2, signal processing in digital transmitter 200 occurs in separate but similarly constructed processing paths, referred to herein as in-phase (I) and quadrature (Q) channels 230i and 230q, respectively. It is to be understood that while certain processing components in FIG. 2 may be described herein as if being realized by a single component, the ordinarily skilled artisan will recognize and appreciate that such description carries the implication of multiple components performing like operations in separate I and Q data processing paths.

Digital transmitter 200 may include a modulator 210 by which modulation symbols are generated from information-bearing signal 205 and conveyed as I and Q data words in respective data channels 230i and 230q. The I and Q data words traverse several data processing stages, such as, for example, baseband processing 215, that may include filtering, upsampling, absolute value computations, etc., and premix processing, which may include noise shaping, encoding and data multiplexing, etc. It is to be understood that baseband processing 215 and premix processing 225 may operate at the same or different sample rates. Each of the I and Q data words in I and Q data channels 230i and 230q are predistorted by an AMAM/AMPM predistortion stage 220, which is described in more detail below. I and Q data channels 230i and 230q, respectively, may terminate at an upconverter 235 by which the predistorted I and Q data words are upconverted into a modulated signal at the carrier frequency $F_C$.

Digital transmitter 200 may include a processor 260 and a memory 250 to implement various functions described herein. That is, certain signal processing operations described below may be carried out by way of processor 260 executing processing instructions 256 in memory 250. However, it is to be understood that the present invention can be carried out in a wide variety of fixed and programmable logic, as well as other digital and analog circuitry.

Figure 3:
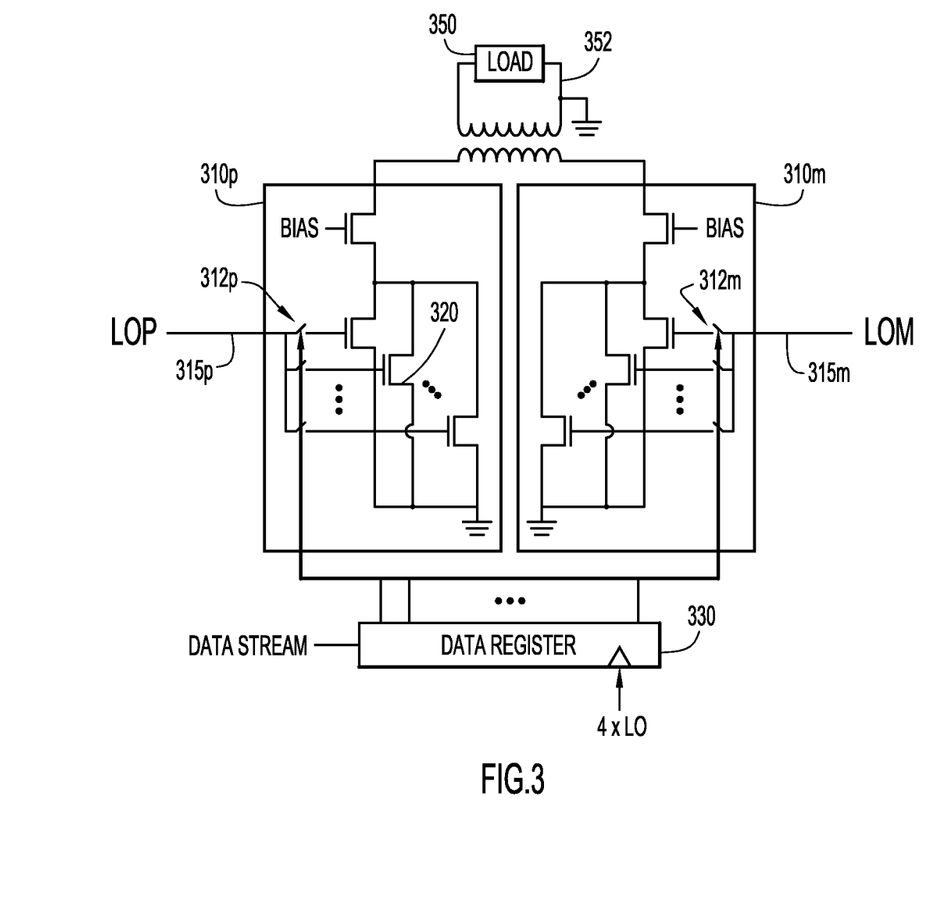
FIG. 3 is a simplified schematic diagram of an RFDAC circuit that can be used in conjunction with the present general inventive concept.

Upconversion in a digital transmitter, such as might be implemented in a digital power amplifier (DPA), is a primary source of distortion. FIG. 3 is a schematic diagram illustrating an example approach in which upconverter 235 may be realized, i.e., by a radio-frequency digital-to-analog converter (RFDAC) 300. RFDAC 300 includes a pair of DAC cell banks 310p, 310m, representatively referred to herein as banks 310, that generate and dictate the direction of current in circuit 352 through load 350. Each bank 310 contains a number of transistor cells, representatively illustrated at transistor 320 and representatively referred to herein as cell(s) 320. In certain RFDAC architectures, such as those implementing a unary (thermometer) code, the output current changes in an f(1/x) relationship, as opposed to an f(x) relationship, as the number of current cells that are activated increases. This characteristic manifests itself as non-linear output, i.e., phase and amplitude distortion, which is linearized by embodiments of the present invention.

Cells 320 in each bank 310 are connected electrically in parallel and banks 310 are electrically connected as a differential pair. Data held in register 330 may select a number of individual cells 320 through switches 312p, 312m, thereby dictating the magnitude of the current that flows through load 350. Local oscillator (LO) signals LOP 315p and LOM 315m may establish a differential voltage across the differential pair of banks 310 thereby dictating the direction in which the current flows through load 350. For purposes of description and not limitation, the "P" in the acronym "LOP" is to designate a "plus" side of RFDAC 300 and the "M" in the acronym "LOM" is to designate a "minus" side of RFDAC 300 and the direction of current is "positive" when flowing from positive to negative. In certain embodiments, data are clocked into register 330 at four times the LO frequency $F_C$ and a new set of LO signals LOP 315p and LOM 315m are differentially applied at that same rate, $4 \cdot F_C$. By this action, an input data stream representing an information-bearing signal is upconverted to the carrier frequency $F_C$ and, in certain embodiments, amplified.

Sample timing of RFDAC 300, i.e., the time periods at which output current can change from moment to moment, is established by application timing of LO signals LOP 315p and LOM 315m. The instantaneous sampling period and the interval between sample pulses can establish the phase of the current flowing through load 350. Additionally, as the number of selected cells 320 changes, the rise time, fall time and delay of LO signals 315p, 315m vary. Thus, a time-varying sample period and a time-varying number of selected current cells dictated by the information-bearing signal can cause a deviation in phase from what would be expected in the output signal. Accordingly, a timing profile in accordance with which the application of LOP signal 315p and LOM signal 315m proceeds can counteract phase distortion generated in RFDAC 300 itself.

Returning once again to FIG. 2, digital transmitter 200 may include a programmable local oscillator (PLO) 265 to provide one or more LO signals 267, such as might be used as LOP and LOM signals 315p, 315m in FIG. 3, in accordance with a control signal 224 generated by AMAM/AMPM predistortion stage 220. That is, the interval between successive sampling pulses, the sampling frequency and the phase may be governed by data in control signal 224.

Predistortion stage 220 cooperates with other components described above to linearize the output of transmitter 200. Upon receiving a data word, either an I data word in I channel 230i or a Q data word in Q data channel 230q, the corresponding predistorter 222i, 222q modifies the data word for AMAM distortion. Such may be achieved by way of an AMAM predistortion function 252, which may be implemented in a continuously computable function, such as by a polynomial, that achieves the predistortion by evaluating the predistortion function 252 with the I or Q data words as arguments. In other embodiments, the AMAM predistortion function is achieved by way of a lookup table (LUT) where, for example, the I or Q data word is used an as index into the LUT and the word at the indexed location may be added to the corresponding I or Q data word. It is to be understood that the present invention is not limited to the manner by which AMAM predistortion is accomplished.

In embodiments of the invention, the AMAM predistorted I and Q data words may be used to obtain a phase difference from AMPM predistortion function 254 to predistort the phase of the I and Q data provided to upconverter 235. Again, AMPM predistortion function 254 may be implemented by a continuously computable function, an LUT, or any other mechanism in which an association between AMAM predistortion data and AMPM predistortion data can be established and by which a phase difference corresponding to the applied AMAM predistortion can be obtained. The retrieved AMPM data are provided on control signal 224 to PLO 265 whereby LO characteristics can be modified to apply a phase difference in the data for purposes of AMPM predistortion.

Figure 4:
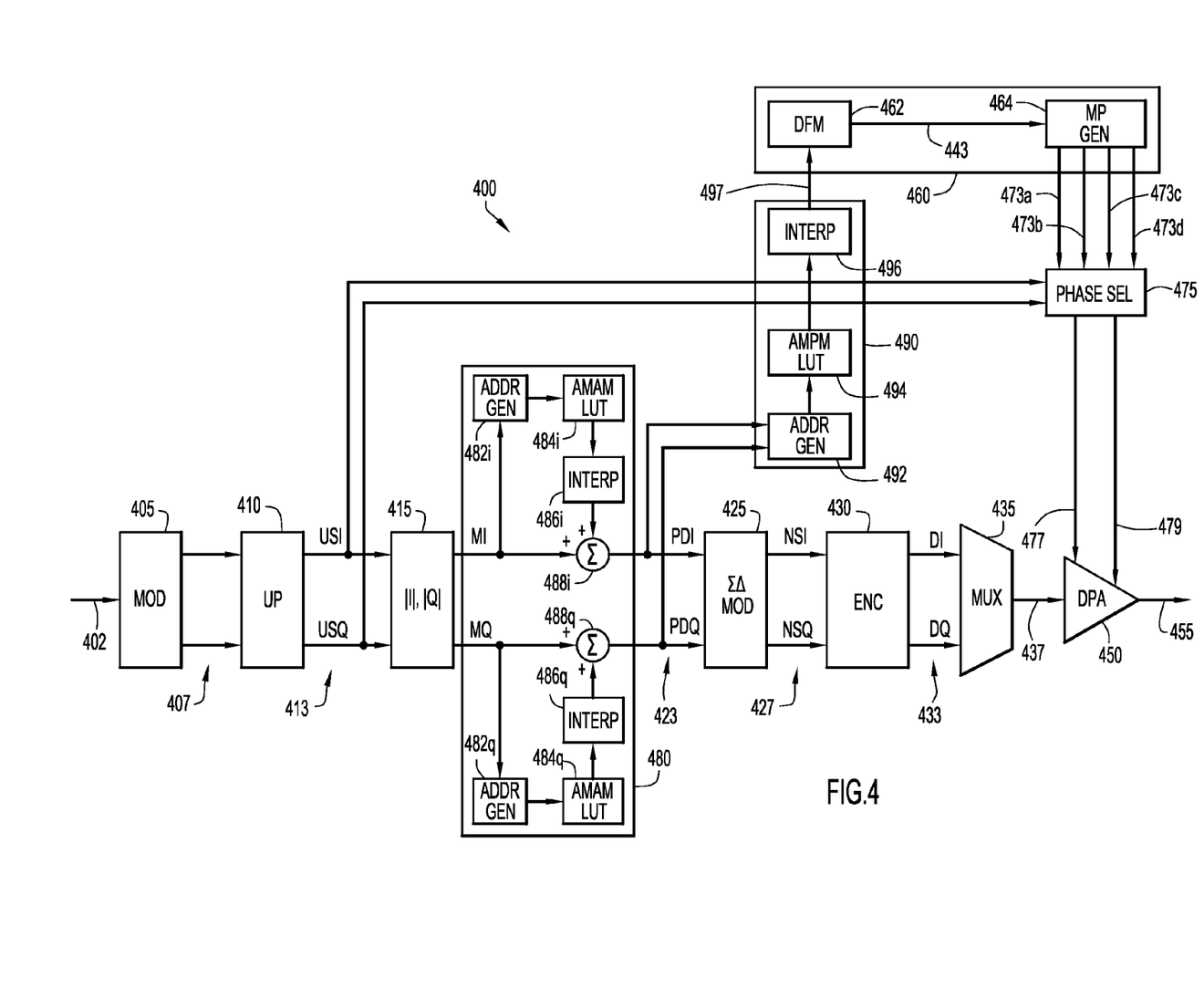
FIG. 4 is a schematic block diagram of another digital quadrature transmitter by which the present general inventive concept can be embodied.

FIG. 4 is schematic block diagram of another example of a digital transmitter 400 by which the present invention can be embodied. Information bearing digital signal 402 may be modulated into a baseband signal 407 by quadrature modulator 405. Baseband signal 407 may comprise I and Q words that together represent time varying phase and amplitude in baseband signal 407. Baseband signal 407 may be upsampled by upsampler 410 to produce an upsampled baseband signal 413, which may be provided to an absolute value processor 415 by which each data word USI, USQ of signal 413 is stripped of its algebraic sign to produce corresponding data words MI, MQ of signal 417. The algebraic signs of USI, USQ may be provided to phase select processor 475, where they may be stored for a number of processing cycles sufficient to account for processing delays from the output of upsampler 410 to DPA 450.

The output of absolute value processor 415 may be provided to AMAM predistortion processor 480, by which the data in I and Q channels are predistorted in accordance with a target predistortion function. The outputted predistorted signal 423 contains predistorted data words PDI, PDQ, which may be provided to sigma-delta modulator (SDM) 425. SDM 425, in turn, modifies the frequency content of predistorted signal 423 so as to reduce the spectral power in a selected frequency band. While such noise shaping is achieved in digital transmitter 400 by sigma-delta modulation, the present invention is not so limited. SDM 425 frequency shifts quantization noise of not only the sampling noise in transmitter 400, but also of that generated by predistortion processing.

Data words NSI, NSQ in noise-shaped signal 427 at the output of SDM 425 may be provided to encoder 430 by which signal 427 is encoded. In certain embodiments, encoder 430 translates the symbols of signal 427 to unary coded symbols (also known as thermometer coding) in signal 433 by which bit states in the coded symbols of signal 437 are used to select the number of current cells in a DAC incorporated in DPA 450, as described above. For example, a unary coded zero (0) selects no cell, i.e., all current cells are in a non-conducting state, and unary-coded full scale, e.g., N ones (1) followed by a zero (0) in the least significant bit position for a total of N+1 bits, corresponds to selection of all cells, i.e., all current cells are in a conducting state. It is to be understood, however, that the present invention is not limited to any particular DAC encoding scheme.

Encoded signal 433 may be multiplexed into a multiplexed data stream 437 by multiplexer 435. Data stream 437 may be a sequence {DI, DQ, DI, DQ, . . . } where DI and DQ are the outputs of encoder 430 by respective I and Q processing channels. Multiplexed data stream 437 may be provided to DPA 450, which produces an amplified signal 455 carrying the information of information-bearing data 402 at the carrier frequency $F_C$.

Digital transmitter 400 may include a PLO 460 to generate phase signals 473a-473d, representatively referred to herein as phase signal(s) 473, in accordance with control signal 497. PLO 460 may include a multiphase signal generator (MP GEN) 464 that produces phase signals 473 from oscillator signal 443 generated by digital frequency modulator (DFM) 462. MP GEN 464 may be implemented by, for example, a frequency divider, a clock generator and suitable logic to generate phase signals 473 from a continuous wave (CW) oscillator signal generated by DFM 462, which may be a phase-locked loop (PLL) oscillator. The amplitude, frequency and phase of oscillator signal 443 may be controlled by control signal 497 from AMPM predistortion processor 490.

In one embodiment, DFM 462 generates oscillator signal 443 at twice the carrier frequency, i.e., at 2×Fc. A frequency divider (not illustrated) in MP GEN 464 may divide oscillator signal 443 into a quadrature LO signal, i.e., two (2) 50% duty cycle LO signals separated in phase by 90°. The 50% duty cycle LO signals may be provided to phase select circuit 475, which forms therefrom LOP signal 477 and LOM signal 479 used to upconvert information bearing signal to carrier frequency $F_C$. In another embodiment, MP GEN 464 may also include logic gates (not illustrated) that produce four (4) 25% duty cycle signals, e.g., phase signals 473, from the 50% duty cycle LO signals. Phase select circuit 475 may generate LOP signal 477 and LOM signal 479 from phase signals 473 to upconvert the information-bearing signal to carrier frequency $F_C$. For purposes of description and not limitation, the 25% duty cycle LO scheme will be assumed for transmitter 400. However, it is to be understood that the present invention is not limited to a particular LO configuration.

Figure 5:
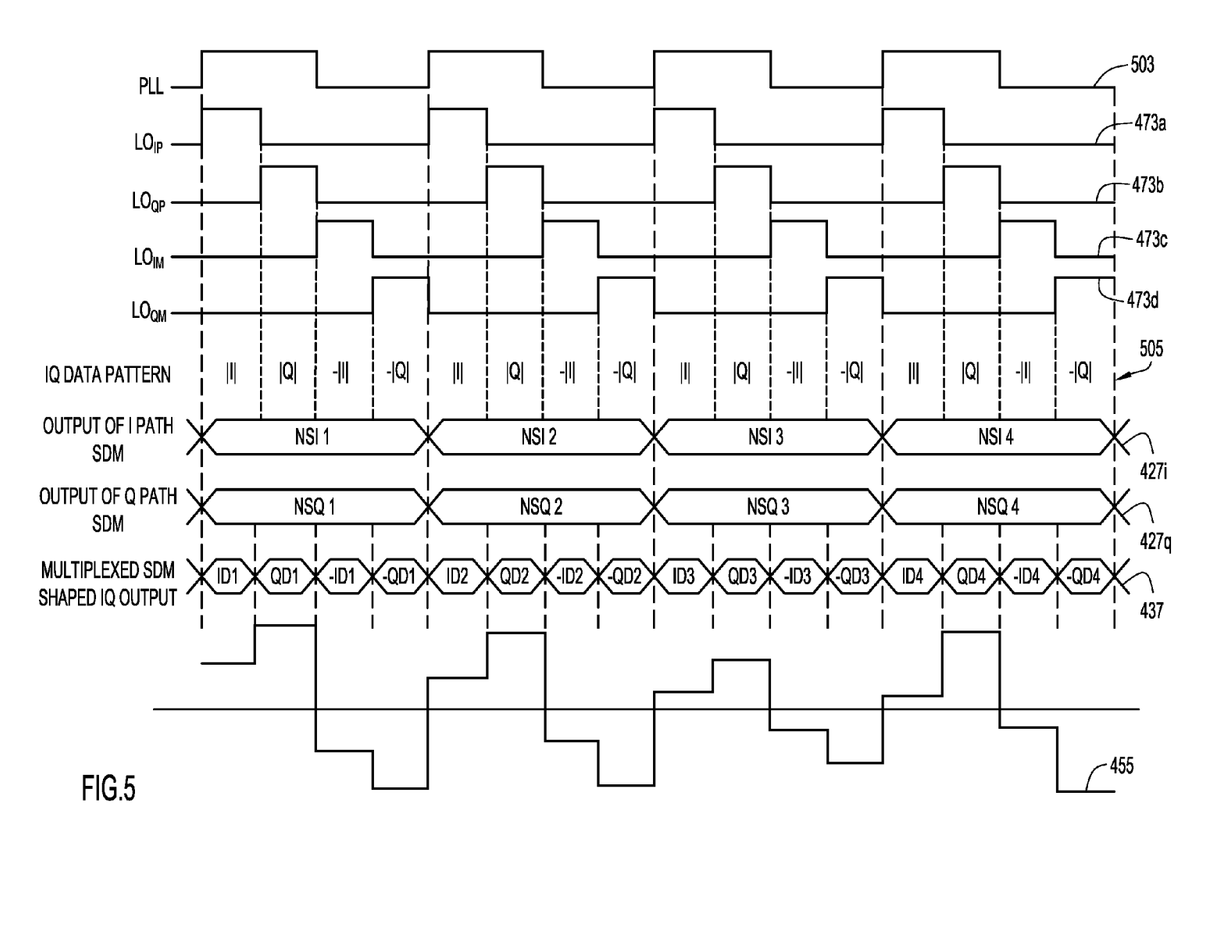
FIG. 5 is a timing diagram illustrating 25% duty cycle timing of the digital quadrature transmitter illustrated in FIG. 4.

Phase signals 473 may be applied to DPA 450 through phase select circuit 475, which, in turn, provides LO signals LOP 477 and LOM 479 to DPA 450. LO signals LOP 477 and LOM 479 may be provided to cell banks of DPA 450 in an order defined by the phase and amplitude of the original baseband signal 413. This is clarified through the timing diagram illustrated in FIG. 5, where PLL signal 503 is generated in MP GEN 464 in accordance with DFM oscillator signal 443. It is to be understood that while phase signals 473 are illustrated in FIG. 5 as having 25% duty cycle non-overlapping pulses, the ordinarily skilled artisan will recognize DPA DAC timing schemes other than those described herein that can be used in conjunction with the present invention.

The data are converted in a prescribed order to produce a correct output signal OUT, i.e., output signal 455. Output signal 455 may be produced from the sequence {I, Q, −I, −Q, I, Q, −I, −Q . . . } or, equivalently, {|I|, |Q|, −|I|, −|Q|, |I|, |Q|, −|I|, −|Q|, . . . }, which is illustrated as data pattern 505 in FIG. 5. Alternatively, the data sequence may take the form {|I+Q|, |I−Q|, −|I+Q|, −|I−Q| . . . }; the present invention is not limited to a particular sequence and format of the data provided to DPA 450. In the embodiment of FIG. 4, the data provided to DPA 450 are derived from the absolute values of the noise-shaped data, i.e., {|NSI|, |NSQ|, |NSI|, |NSQ|, |NSI|, |NSQ|, |NSI|, |NSQ|, . . . } and the algebraic signs thereof are used only to determine the direction of current in a load (not illustrated) connected to DPA 450. As such, the algebraic signs are used to select the phase of the phase signals 473 that are applied as LOP signal 477 and LOM 479. For example, phase signals 472 may be selected and applied in accordance with the following Table 1:

TABLE 1

| Case | Phase Selected | Complementary Phase |
|---|---|---|
| MI > 0 and MQ > 0 | $LO_{IP}$ (Phase 0) to LOP | $LO_{IM}$ to LOM |
| MI > 0 and MQ < 0 | $LO_{QM}$ (Phase 3) to LOM | $LO_{QP}$ to LOP |
| MI < 0 and MQ > 0 | $LO_{QP}$ (Phase 1) to LOP | $LO_{QM}$ to LOM |
| MI < 0 and MQ < 0 | $LO_{IM}$ (Phase 2) to LOM | $LO_{IP}$ to LOP |

That is, for each phase selection case defined by the algebraic signs of MI and MQ, a specific phase signal 443 is applied as either LOP signal 477 or LOM signal 479 and the complementary phase signal, i.e., the phase signal 443 having the complementary polarity "plus" or "minus," is applied to the other of LOP signal 477 or LOM signal 479. For example, in the case where (MI>0) and (MQ<0), $LO_{QM}$ is provided to DPA 450 as LOM signal 479, thereby establishing the LO state on the "minus" side of the DAC. The complementary signal $LO_{QP}$, i.e., the "plus" signal complementary to the "minus" signal, is provided to DPA 450 as LOP signal 477. Thus, the algebraic signs of MI and MQ establish the direction of current through an attached load.

DPA 450 accepts DI and DQ inputs in data stream 437, as sampled by LO signals 477, 479 selected from phase signals 473, and up-converts the original modulated signal 407 by converting the values DI, DQ, −DI, −DQ at four (4) times the LO rate, i.e., these four outputs DI, DQ, −DI, −DQ are sampled by phase signals 473 inside one cycle of PLL 503, which, in the illustrated embodiment, has the carrier frequency $F_C$. The converted output signal 455 thus has the period corresponding to the carrier frequency $F_C$.

AMAM predistortion processor 480 predistorts signal 417 comprising the pair of signals 417i and 417q. In the exemplary embodiment illustrated in FIG. 4, a lookup table (LUT) address is generated from I and Q data words in respective signals 417i and 417q in respective address generators 482i and 482q. The addresses are used to access AMAM predistortion LUTs 484i, 484q and the values obtained from the respective LUTs are provided to adders 488i, 488q through, in certain embodiments, respective LUT interpolators 486i, 486q. The output of AMAM predistortion processor 480 is signal 423, which carries data words PDI, PDQ to SDM 425 as well as to AMPM predistortion processor 490. It is to be understood, however, that the LUT entries, or the interpolated values thereof, may be provided to AMPM predistortion processor 490 as opposed to the predistorted values PDI, PDQ. Again, the present invention is not limited to a particular AMAM processing technique.

The values PDI, PDQ in signal 423 may be provided to an address generator 492 in AMPM predistortion processor 490. The address generated by address generator 492 may be used to obtain a value from AMPM LUT 494 by which a phase adjustment can be made in DPA 450. In one embodiment, a phase angle is computed by address generator 492 as the angle measured from the positive real axis in the complex plane to a point having an I coordinate equal to PDI and a Q coordinate equal to PDQ. The computed phase angle may be established as an index into AMPM LUT 494 to obtain AMPM predistortion data stored at a location in AMPM LUT 494 corresponding to that index. However, it is to be understood that the present invention is not limited to any particular LUT addressing scheme.

In one embodiment, the data stored in AMPM LUT 494 are indicative of a frequency or an advance or delay in phase of an oscillator signal 443 that DFM 462 generates at its output. Oscillator signal 443 may be a CW signal used as a base signal from which direct frequency modulation PLL signals are generated, such as PLL signal 503 in FIG. 5. The frequency, advance or delay for PLL signals based on oscillator signal 443 is conveyed to DFM 462 by way of control signal 497 provided at the output of AMPM predistortion processor 490. DFM 462 may be highly adjustable with fine resolution and, as such, data from AMPM LUT 494 may be suitably interpolated by an interpolator 496.

Figure 6A:
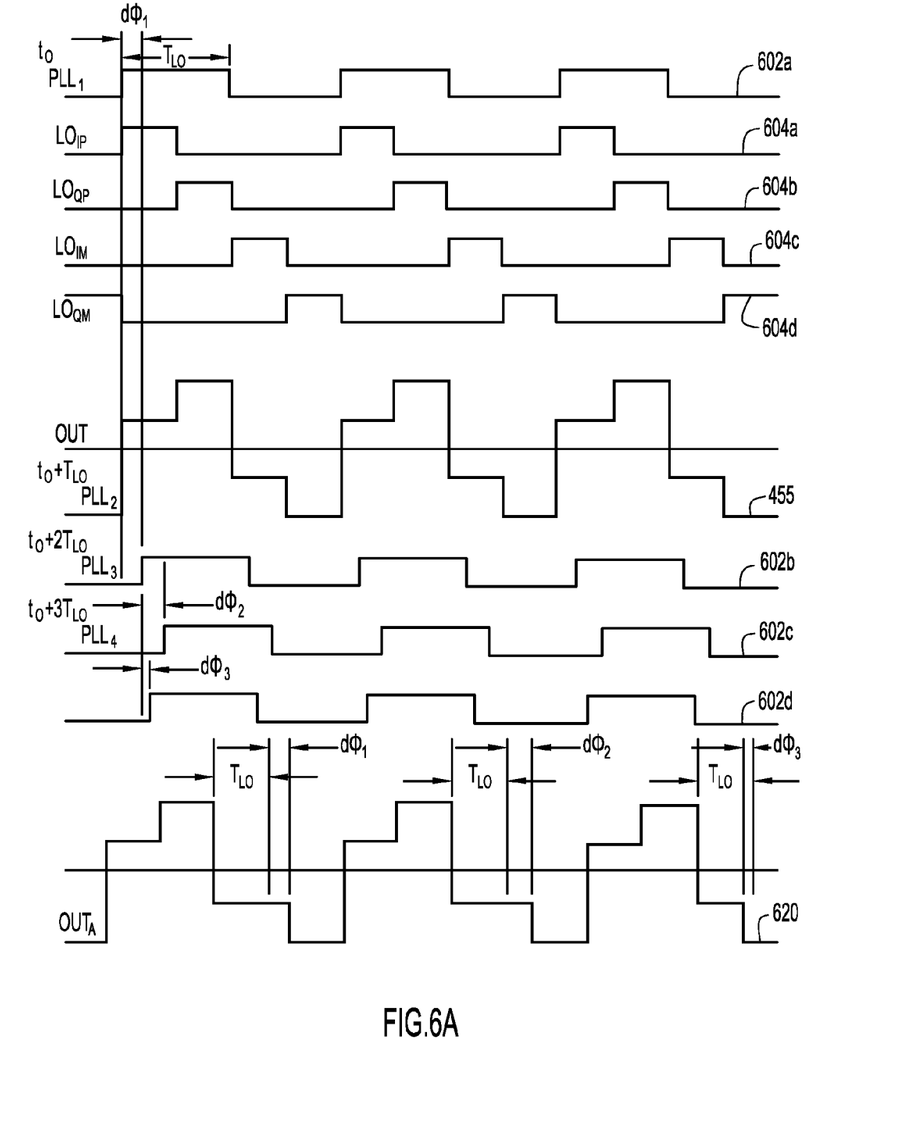
FIGS. 6A-6B are timing diagrams illustrating AMPM predistortion by which the present general inventive concept can be embodied.
Figure 6B:
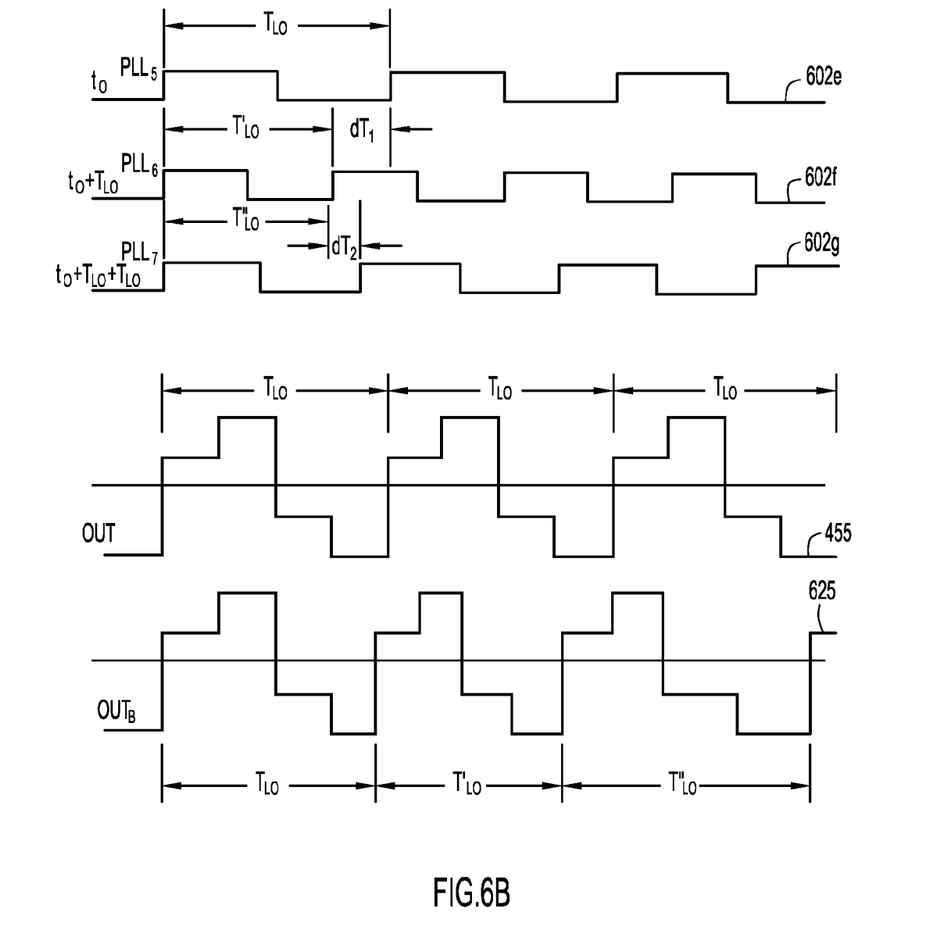

FIG. 6A is a timing diagram illustrating an exemplary AMPM predistortion technique that can be embodied by the present invention. PLL signal 602, illustrated as 602a-602g in FIGS. 6A-6B, is controlled by, for example, DFM oscillator signal 443, to provide an LO signal equal to the carrier signal in frequency $F_C$. PLL signal 602 may be divided into 25% duty cycle LO phase signals $LO_{IP}$ signal 604a, $LO_{QP}$ signal 604b, $LO_{IM}$ signal 604c and $LO_{QM}$ 604d representatively referred to herein as 25% duty cycle LO signal(s) 604. The 25% duty cycle LO signals 604 are selected by phase selector 470, which selects a LO phase signal 604 in accordance with the sign of the I and Q data, as described above with reference to Table 1. The phase of PLL signal 602 can be modified by a phase differential dϕ applied to oscillator signal 443, which is then carried in 25% duty cycle LO phase signals 604. That is, the phases of 25% duty cycle LO signals 604 are advanced or delayed by an amount equal to the amount of advance or delay imparted to PLL signal 602. As illustrated in FIG. 6A, a non-distorted output signal 455 is generated from a constant non-modified PLL signal $PLL_1$ 602a. In a subsequent period of $PLL_1$ signal 602a, i.e., $t_0+T_{LO}$, AMPM predistorter 460 may convey AMPM predistortion data in control signal 497 to delay the phase of oscillator signal 443 and, accordingly, the PLL signal generated in MP GEN 464, by an amount $dϕ_1$ as illustrated at $PLL_2$ signal 602b. In the next period $t_0+2T_{LO}$, predistorter 490 may delay the phase by an amount $dϕ_2$, as illustrated at $PLL_3$ signal 602c, followed an advance of phase by an amount $dϕ_1$ at $t=t_0+2T_{LO}$ as illustrated at $PLL_4$ signal 602d. The result of these phase adjustments in successive periods $T_{LO}$ is illustrated at output signal 620, where the phase of the output signal 620 varies from period to period.

However, it is to be understood that, in certain circumstances, application of a different phase differential $d\phi_1$ in successive periods may not be necessary. The phase differential $d\phi_1$ may be determined in accordance with AMAM predistorted data words PDI, PDQ in signal 423 and the associations thereof with the content of AMPM LUT 494.

It is to be understood that while the change in phase illustrated in FIG. 6A is imparted at the carrier frequency $F_C$, the present invention is not so limited. The ordinarily skilled artisan will appreciate that phase changes may also be imposed at a much lower rate, such as the symbol rate of the information-bearing signal.

FIG. 6B illustrates another AMPM predistortion technique that may be implemented by AMPM predistorter 490. Rather than delaying or advancing the phase of PLL signal 602, the period of PLL signal 602 may be changed by an amount dT from period to period, as needed. That is, since $\omega=2\pi f=d\phi/dt$, the rate of change of the phase is defined by the signal frequency and, as such, a change in frequency manifests itself as a modification to the rate of change of the phase.

As illustrated in FIG. 6B, at a time $t_0$, the period of PLL signal 602e is $T_{LO}$ and, at a time $t_0+T_{LO}$, the period of PLL signal 602f is $T'_{LO}$, which is $T_{LO}-dT_1$. This may be achieved by modifying the oscillator frequency of DFM 462, which serves as a basis signal of MP GEN 464, in accordance with data in AMPM LUT 494 conveyed in signal 497. Subsequently, at time $t_0+T_{LO}+T'_{LO}$, the period of PLL signal 602g is changed by an amount $dT_2$ to have a period $T''_{LO}$. The resulting predistorted output signal $OUT_B$ 625 comprises temporally expanded and compressed intervals that vary with the PLL frequency established by DFM 498, which itself is controlled by data in AMPM LUT 494.

In certain embodiments of the present invention, the implemented AMPM predistortion scheme is a combination of advancing and delaying the phase of oscillator signal 443 in accordance with control signal 497, as described with reference to FIG. 6A, and compressing and expanding the period of oscillator signal 443, as described with reference to FIG. 6B. It is to be noted that the AMPM predistortion is performed by way of changes in LO frequency and phase timing and not by way of modification to values of the I and Q data words, as is performed in the AMAM predistortion. Accordingly, the impact on phase of the AMAM predistortion is accounted for in the AMPM predistortion without further modification of the I and Q data words.

AMAM LUTs 484i, 484q and AMPM LUT 496 may be populated with data obtained by a calibration procedure. The ordinarily skilled artisan will recognize numerous such calibration procedures, and the present invention is not limited to any particular technique. Such calibration may include procedures by which associations between AMAM predistortion values and AMPM predistortion values are obtained.

Figure 7:
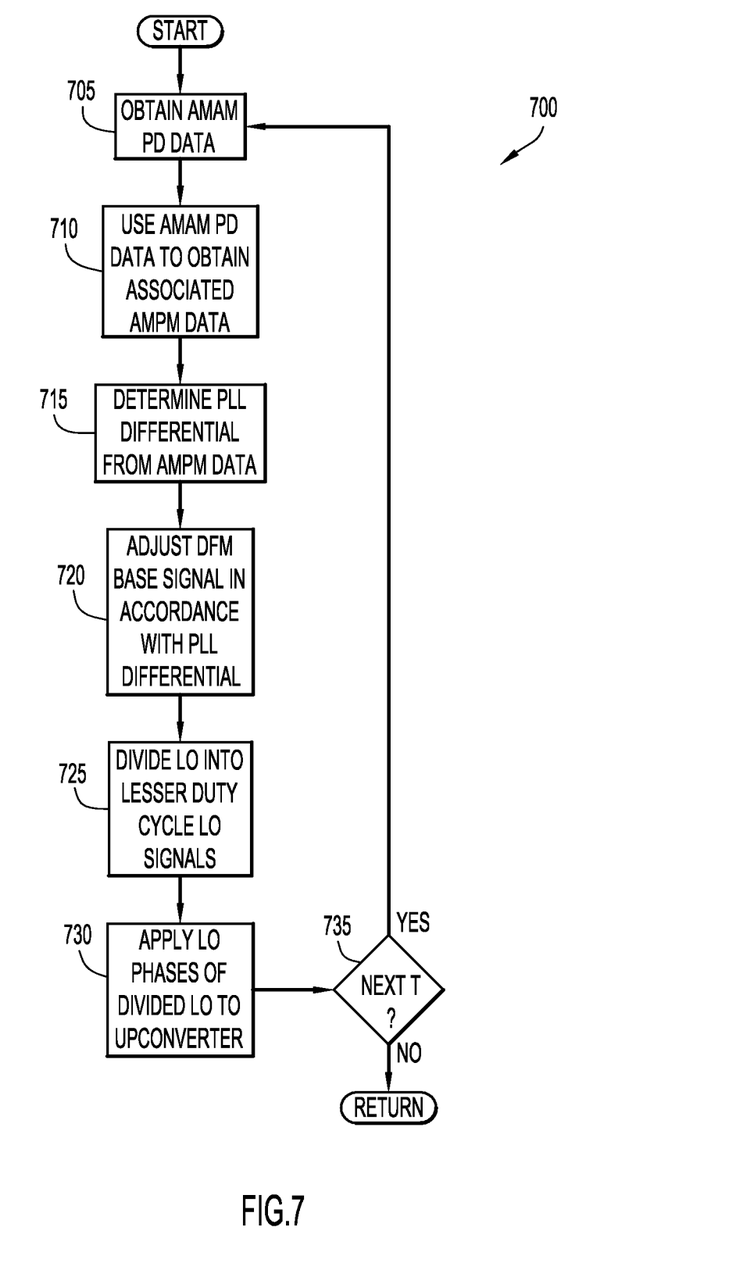
FIG. 7 is a flow diagram of an exemplary predistortion process by which the present general inventive process can be embodied.

FIG. 7 is a flow diagram of an exemplary predistortion process 700 by which the present invention can be embodied. In operation 705, AMAM predistorted data is obtained, such as at the output of AMAM predistorter 480. In operation 710, the AMAM predistorted data are used to obtain associated AMPM predistortion data. For example, the AMAM predistorted data may be used to form an address into an AMPM LUT at which associated AMPM predistortion data are stored. In operation 715, a PLL differential is determined from the AMPM predistortion data. The PLL differential may be a combination of a phase delay or advance $d\phi_1$ and a period expansion or contraction dT and may be determined directly from the AMPM LUT data. For example, the data stored in AMPM LUT 494 may be a basis for a control word for DFM 462; the AMPM LUT 494 establishes both frequency and phase of oscillator signal 443 from which MP GEN 464 derives an LO signal. In operation 720, the oscillator signal 443 of DFM 462 is adjusted, by way of, for example, control signal 497, with the PLL differential determined in operation 715. In operation 725 an LO signal generated from oscillator signal 443 is divided into lesser duty cycle LO phase signals 473. The lesser duty LO phase signals 473 are applied to DPA 450 in a sequence defined by the I and Q data words. Process 700 repeats at operation 705 for successive periods of the PLL LO generated in MP GEN 464 or at, for example, the symbol rate of the I and Q data, as representatively illustrated at operation 735.

Figure 8:
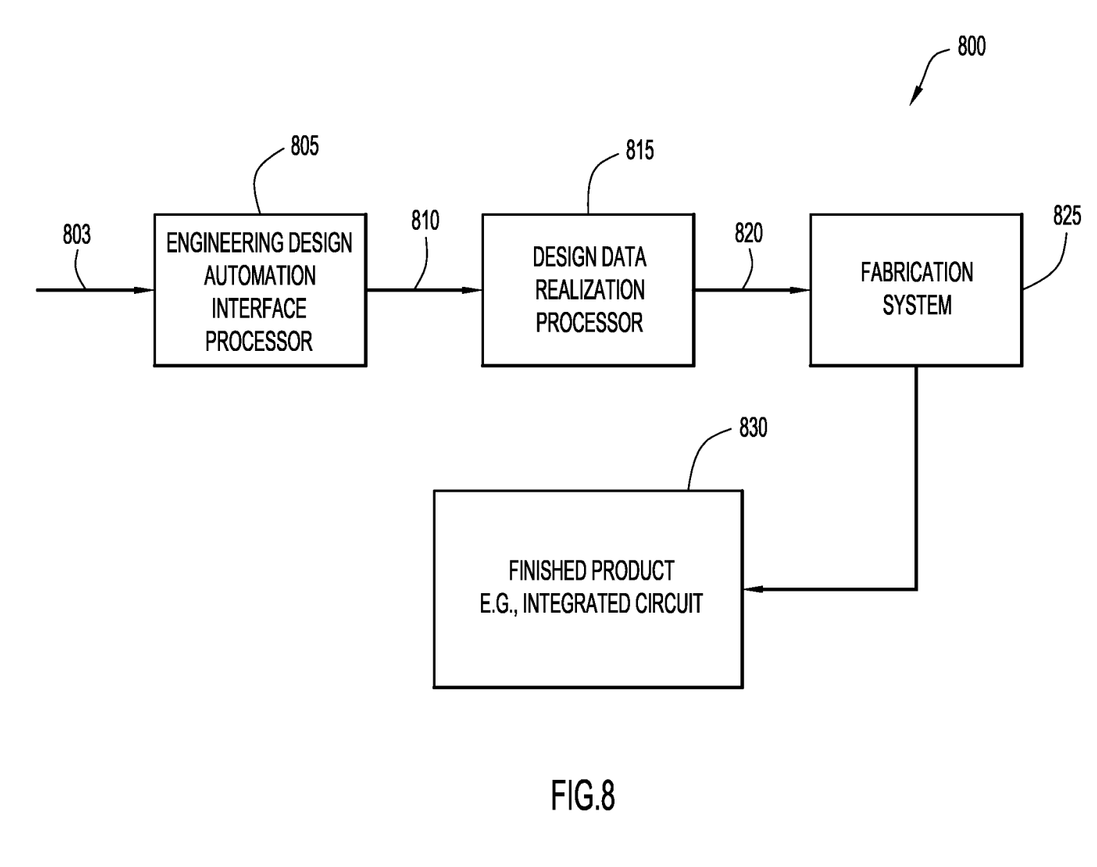
FIG. 8 is a block diagram of a circuit design and fabrication process by which a signal modulator circuit embodying the present general inventive concept may be fabricated.

Certain embodiments of the present invention provide for the functional components to be manufactured, transported, marketed and/or sold as processor instructions encoded on non-transitory computer-readable media. For example, one such computer-readable medium (not illustrated) may be provided to a circuit fabrication process 800, illustrated in FIG. 8, carrying processor instructions 803 that, when executed by an Electronic Design Automation (EDA) interface processor 805, a graphical representation of an embodiment of the present invention is presented to a user, such as on a display device (not illustrated). Through EDA interface 805, a circuit designer may incorporate the present invention into a larger circuit design. Once a circuit design has been completed, another non-transitory computer-readable medium (not illustrated) carrying other processor instructions 810, such as a hardware description language, may be provided to a design data realization processor 815. The design data realization processor 815 may convert the instructions 810 provided thereto into another set of processor instructions 820, by which a tangible integrated circuit 830 may be realized when executed by a circuit fabrication system 825. Such realization data 820 may include data to construct component and interconnect mask patterns, component placement location data, packaging data, and any other data necessary in a fabrication process to produce the finished circuit product 830. Other realization data 820 may include milling machine instructions and wiring instruction data, where the specific form of the realization data 820 is dependent on the type of circuit 830 in which the present invention is embodied.

Processor instructions 803, 810 and 820 may be encoded on non-transitory computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions 803, 810 and 820, as well as processor instructions that implement process 700 in FIG. 7, may be encoded and then subsequently retrieved, decoded and executed by a processor, where such media includes electrical, magnetic and optical storage devices. Examples of non-transitory computer-readable media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present invention as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A digital transmitter comprising:
a digital upconverter generating a radio-frequency (RF) output signal having a predetermined output frequency from a sequence of predistorted digital in-phase (I) and quadrature (Q) data words generated from respective input I and Q data words provided from respective I and Q data channels;
a programmable local oscillator (PLO) that provides a local oscillator (LO) signal to the digital upconverter in accordance with which the predetermined output frequency is established, the phase and period of the LO signal being selectable in accordance with a control signal provided to the PLO; and
a predistortion processor receiving the input I and Q data words from the respective I and Q data channels and generating the predistorted I and Q data words, the predistortion processor comprising:
an amplitude-modulation (AM) to AM (AMAM) predistortion processor that predistorts the I and Q data words in accordance with an AMAM distortion profile of the digital upconverter; and
an AM to phase-modulation (AMPM) predistortion processor to provide the control signal to the PLO in accordance with the predistorted I and Q data words obtained from the AMAM predistortion processor, the control signal being indicative of a phase shift or period change in the LO signal at selected periods thereof in accordance with an AMPM predistortion profile of the digital upconverter,
wherein the control signal is indicative of both the phase shift and the period change in the LO signal.

2. The digital transmitter of claim 1, wherein the AMPM predistortion processor comprises:
an AMPM lookup table stored in a memory; and
an address generator to computing an address into the AMPM lookup table from the predistorted I and Q data words at which AMPM predistortion data associated with the predistorted I and Q data words is stored, wherein the control signal is generated in accordance with the AMPM predistortion data.

3. The digital transmitter of claim 2, wherein the address generator generates the address from a modulation phase angle of a symbol having an I coordinate specified by the predistorted I data word and a Q coordinate specified by the predistorted Q data word.

4. The digital transmitter of claim 1, wherein the AMPM predistortion processor computes the AMPM predistortion data from a machine evaluation of a continuous function that takes the predistorted I and Q data words as arguments.

5. The digital transmitter of claim 1, wherein the PLO comprises:
a phase signal generator to generate one or more LO signals from an oscillator signal provided thereto; and
a digital frequency modulator (DFM) to generate the oscillator signal in accordance with which the phase signal generator generates the LO signals, the DFM delaying or advancing the phase of the oscillator signal, or expanding or contracting the period of the oscillator signal in accordance the control word.

6. The digital transmitter of claim 5, wherein the phase signal generator generates four (4) 25% duty cycle LO signals.

7. The digital transmitter of claim 1, wherein the selected periods are periods corresponding to a symbol rate of the input I and Q data words.

8. The digital transmitter of claim 1, wherein the selected periods are periods corresponding to the predetermined output frequency.

9. A method of signal predistortion in a digital transmitter comprising:
obtaining amplitude-modulation (AM) to AM (AMAM) predistortion data that, when applied to a digital quadrature signal, predistorts in-phase (I) and quadrature (Q) data words thereof into AMAM predistorted I and Q data words;
obtaining AM to phase-modulation (AMPM) predistortion data that is associated with the AMAM predistorted I and Q data words;
compelling a frequency change or a phase shift in a local oscillator (LO) signal in accordance with the AMPM predistortion data;
providing the frequency-changed or phase-shifted LO signal to a digital upconverter such that an output signal thereof is linearized with respect to at least phase distortion in the digital upconverter;
generating an oscillator signal in accordance with which the LO signal is assigned frequency and phase; and
delaying or advancing the phase of the oscillator signal, or increasing or decreasing the frequency of the oscillator signal in accordance with the AMPM predistortion data.

10. The method of signal predistortion of claim 9 further comprising:
computing an address into an AMPM lookup table from a combination of the AMAM predistorted I and Q data words; and
obtaining the AMPM predistortion data from the AMPM lookup table at the computed address.

11. The method of signal predistortion of claim 9 further comprising:
obtaining the AMPM predistortion data from a modulation phase angle of a symbol having an I coordinate specified by the AMAM predistorted I data word and a Q coordinate specified by the AMAM predistorted Q data word; and
determining the AMPM predistortion data from the modulation phase angle.

12. The method of signal predistortion of claim 9 further comprising:
computing the AMPM predistortion word from a machine evaluation of a continuous function that takes the AMAM predistorted I and Q data words as an argument.

13. The method of signal predistortion of claim 9 further comprising:
generating a control signal indicative of the AMPM predistortion data; and
generating the oscillator signal by a digital frequency modulator in accordance with the control signal.

14. The method of signal predistortion of claim 9 further comprising:
dividing the LO signal into a plurality of lesser duty cycle LO signals; and modifying the phase of the lesser duty cycle LO signals by the delaying or advancing of the phase of the oscillator signal, or the increasing or decreasing of the frequency of the oscillator signal.

15. The method of signal predistortion of claim 9, wherein compelling the frequency change or the phase shift in the LO signal occurs at selected periods thereof.

16. The method of signal predistortion of claim 15, wherein the selected periods are periods corresponding to a symbol rate of the I and Q data words.

17. The method of signal predistortion of claim 15, wherein the selected periods are periods corresponding to a predetermined output frequency output by the digital upconverter.

* * * * *